Dec. 25, 1962

J. J. C. MEYS 3,070,738

VOLTAGE STABILIZER

Filed June 22, 1959

INVENTOR
JOHANNES JACOBUS CANISIUS MEYS
BY
AGENT

United States Patent Office 3,070,738
Patented Dec. 25, 1962

3,070,738
VOLTAGE STABILIZER
Johannes Jacobus Canisius Meys, Hilversum, Netherlands, assignor to North American Philips Company, Inc., New York, N.Y., a corporation of Delaware
Filed June 22, 1959, Ser. No. 821,728
4 Claims. (Cl. 321—27)

In practice frequently a direct-voltage stabilizer of comparatively high power, for example at least 2 kvA., is required, which must be able to satisfactorily adjust rapid voltage variations between no load and full load at a frequency between about 0 c./s. and 1000 c./s.

In general this cannot be done economically owing to the following reasons.

A mechanical regulator, such as a regulating transformer driven by a motor, or the combination of a transductor, the direct-current energization of which is controlled with the aid of a mechanical high-speed regulator, and an uncontrolled rectifier have high power outputs of, for example, between 50 kvA. and 100 kvA., however, the regulating frequency is at most 1 c./s.

The regulators using transductors and an uncontrolled rectifier, which have a power of from 50 kvA. to 100 kvA., or thyratrons having a power of, for example, 2 kvA., are limited to a range of from 0 c./s. to 50 c./s. and generally to 10 c./s. The same applies to ignitrons the powers of which may exceed 100 kvA. With entirely electronic regulating arrangements a range of from 0 c./s. to 1000 c./s. can readily be covered, however, these arrangements are not economical at powers exceeding 100 w.

Hence it will be appreciated that the above-mentioned requirement of a high power together with a quick regulation at a high frequency between no load and full load cannot be satisfied without further expedients.

Fortunately, however, the desired high regulating frequency forms only a small part of the rectifier load, a large part of this load being subject to variations at a low regulating frequency.

The present invention is based on the recognition of these facts.

According to the invention, the voltage stabilizer is characterized in that it comprises two parallel-connected controllable rectifiers of which one has a high power and is capable of compensating for a load variation at a low frequency while the other has a small power and is capable of compensating for load variations of high frequency which on their occurrence are compared in a comparison circuit to a constant reference voltage in order to obtain a control voltage for adjusting the output voltage of the first-mentioned rectifier in a manner such that the other rectifier always operates at least substantially in the middle portion of its control range.

Figure 1:
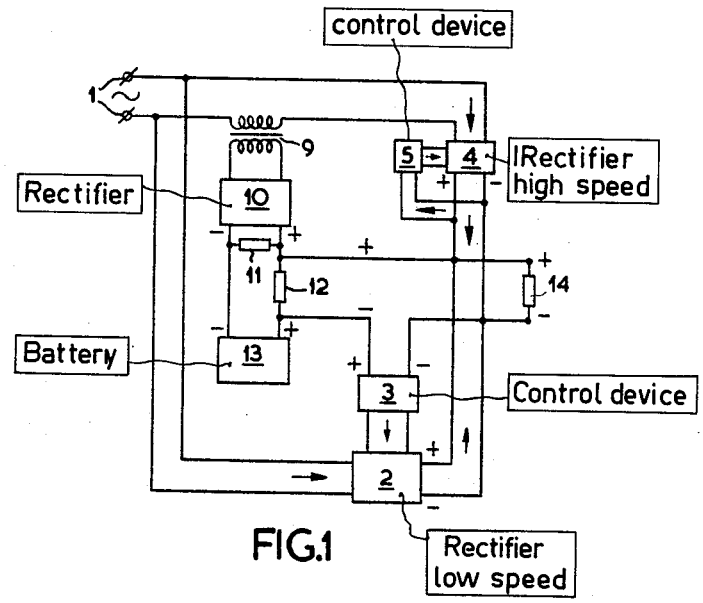
Figure 2:
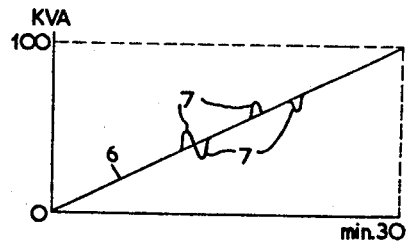
Figure 3:
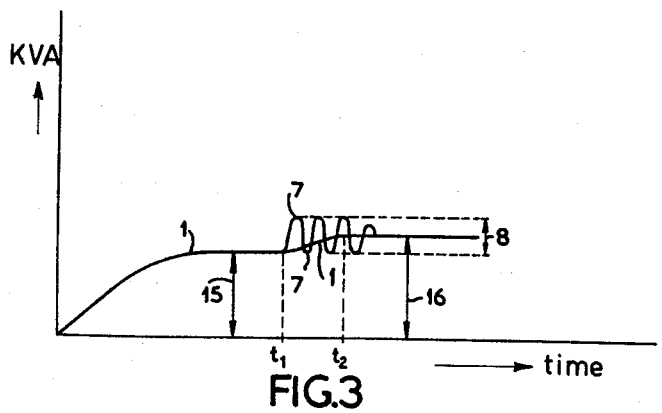

In order that the invention may readily be carried out, an embodiment thereof will now be described, by way of example, with reference to the acompanying drawings, in which:

FIGURE 1 is a circuit arrangement of a voltage stabilizer in accordance with the invention, while FIGURES 2 and 3 are illustrative diagrams.

In FIGURE 1, there are connected to an alternating voltage source 1 a rectifier 2 of high power comprising an uncontrolled rectifier provided with a transductor regulator 3 for low regulating frequencies and an electronic rectifier 4 of small power provided with a high-speed electronic regulator 5.

The control devices 3 and 5 are of known types. The device 3 is a device comprising a transductor, by which a phase-shift of the control pulses is obtained dependent on the direct current fed to the direct current winding of the transductor by the circuit 14—3—12.

FIGURE 2 shows a load line 6 from no load to full load (100 kvA.) the regulation being effected with the aid of the low-speed regulating rectifier 2 in, say, ¼ or ½ of an hour. However, rapid load variations of small amplitude and high frequency, for example 500 c./s. occur which are designated 7 and are compensated for by the high-speed rectifier 4. This is effected in a manner shown on a greatly enlarged scale in FIGURE 3. Up to the instant $t_1$ the rectifier 2 is regulating. When rapid load variations 7 of small amplitude occur, compensation is effected by the rectifier 4 under the control of the regulator 5. The slow regulation by the rectifier 2, produced according to a curve 1 between the instants $t_1$ and $t_2$ adjusts the voltage at the output of the rectifier 2, and at the load 14 so that the load distribution between rectifiers 2 and 4 is reestablished at a point whereby the rectifier 4 operates at the center of its regulating range 8.

This is effected in the system of FIG. 1 in the following manner.

With the increase in the load as shown by the peaks 7 the rectifier 4 is called upon to supply additional energy so that its alternating current input will increase. The greater current passing through the primary of transformer 9 induces a greater voltage in the secondary of this transformer. The secondary voltage of transformer 9 is rectified by a rectifier 10 having an output resistor 11 and, through a resistor 12, is compared with the voltage of the battery 13. The voltage across the resistor 12 is in turn compared with the voltage of the load 14 and the resultant voltage applied to the regulator 3. Accordingly, changes of the voltage across resistor 11 from the normal operating value and changes of the voltage across load 14 will produce a change of the net control voltage supplied to the regulator 3. The regulator 3 modifies the output of rectifier 2 in the proper sense so that the long time change in the load is taken over by the rectifier 2 and the rectifier 4 is returned to the operating condition at the center of its power output range.

More particularly, when the voltage across 11 exceeds that of the battery 13, such as occurs when a sudden change in load occurs, causing the rectifier 4 to draw more particularly from the power means, an additional voltage ΔV is set up across the resistor 12 so that with the aid of the regulator 3 the output of the rectifier 2 is raised to the value 16 of FIG. 3. The high-speed rectifier 4 then returns to the center of its operating range and is then in the condition to compensate both for positive and negative sudden load voltage variations from the new load value.

When the load changes are negative, the operation of the regulator is reversed.

Instead of regulation with the aid of the alternating current through the transformer 9, in principle the output voltage of the rectifier 4 can be used as a control quantity.

What is claimed is:

1. Electrical apparatus comprising input means for a source of electrical energy, output means for supplying a load circuit, and means for applying a stabilized voltage to said load circuit through said output means, said stabilized voltage means comprising a first regulated power supply of given capacity interposed between said input and output means, said first supply having a given relatively slow response upon variations of the voltage at said load, a second regulated power supply of smaller capacity than said first supply interposed between said input and output means, said second supply having a regulating range about a central value and having a response substantially faster than the response characteristic of said first supply, second regulating means connected to said output means and the second rectifier means for controlling the output voltage of said second rectifier system, means for producing a control voltage having variations as determined by variations of the operating point of said second power supply, and means responsive to said control voltage for adjusting the operating point of said first supply to a point at which said second supply operates centrally of its regulating range.

2. Electrical apparatus comprising input means for a source of alternating current, output means for supplying a load circuit, and means for applying a stabilized direct voltage to said load circuit through said output means, said stabilized voltage means comprising a first rectifier system of given capacity interposed between said input and output means, first regulating means connected to said rectifier system for controlling the output voltage thereof, said rectifier system and regulating means having a response characteristic limited to relatively slow changes of the voltage applied to said load, a second rectifier system of smaller capacity than said first rectifier system interposed between said input and output means, said second system having a response characteristic substantially faster than the response characteristic of said first system, second regulating means connected to the said output means and the second rectifier system for controlling the output voltage of said second rectifier system, a source of reference voltage, means for producing a second voltage having variations as determined by variations of the operating point of said second power supply, means for comparing said reference voltage and said second voltage thereby to produce a control voltage, and means for applying said control voltage to said first regulating means thereby to adjust the operating point of said first rectifier system to a point at which said second rectifier system operates centrally of its regulating range.

3. Electrical apparatus comprising input means for a source of alternating current, output means for supplying a load circuit, and means for applying a stabilized direct voltage to said load circuit through said output means, said stabilized voltage means comprising a first rectifier system of given capacity interposed between said input and output means, first regulating means connected to said rectifier system for controlling the output voltage thereof, said rectifier system and regulating means having a response characteristic limited to relatively slow changes of the voltage applied to said load, a second rectifier system of smaller capacity than said first rectifier system interposed between said input and output means, said second system having a response characteristic substantially faster than the response characteristic of said first system, second regulating means connected to the said output means and the second rectifier system for controlling the output voltage of said second rectifier system, means connected to said second rectifier system for producing a first voltage as determined by the energy input to said second rectifier system, a source of reference voltage, means for comparing said first voltage and said reference voltage thereby to produce a comparison voltage, means for comparing said comparison voltage and the voltage at said output means thereby to produce a control voltage, and means for applying said control voltage to said first regulating means thereby to adjust the operating point of said first system to a point at which said second system operates centrally of its regulating range.

4. Electrical apparatus as claimed in claim 1 wherein said means for producing a control voltage having variations as determined by variations of the operating point of said second power supply, comprises a current transformer interposed between said input means and said second regulated power supply, and rectifier means energized by said current transformer.

References Cited in the file of this patent

UNITED STATES PATENTS

| 2,322,955 | Perkins | June 29, 1943 |
| 2,625,675 | Lupo | Jan. 13, 1953 |
| 2,734,160 | Franks et al. | Feb. 7, 1956 |
| 2,872,636 | Wheatley | Feb. 3, 1959 |

FOREIGN PATENTS

| 153,639 | Australia | Oct. 15, 1953 |